United States Patent [19]

Marchand

[11] Patent Number: 4,704,972
[45] Date of Patent: Nov. 10, 1987

[54] METHOD AND APPARATUS FOR REDUCING ACID POLLUTANTS IN SMOKE

[75] Inventor: Denis Marchand, Le Pecq, France

[73] Assignee: Societe dite: SOGEA, Rueil Malmaison, France

[21] Appl. No.: 3,340

[22] Filed: Jan. 13, 1987

[30] Foreign Application Priority Data

Jan. 14, 1986 [FR] France .................. 86 00533

[51] Int. Cl.$^4$ .................. F23J 11/00; F23J 15/00
[52] U.S. Cl. .................. 110/345; 55/80; 55/269; 55/90; 110/215; 110/216
[58] Field of Search .................. 110/344, 345, 215, 216; 55/269, 80, 90

[56] References Cited

U.S. PATENT DOCUMENTS

| | | | |
|---|---|---|---|
| 3,726,239 | 4/1973 | Burbach | 110/345 |
| 4,019,444 | 4/1977 | Kleeberg et al. | 110/344 X |
| 4,285,282 | 8/1981 | Good | 110/216 X |
| 4,309,947 | 1/1982 | Ketterer | 110/345 X |
| 4,651,655 | 3/1987 | Kunzel | 110/345 |

Primary Examiner—Edward G. Favors
Attorney, Agent, or Firm—Sughrue, Mion, Zinn, Macpeak and Seas

[57] ABSTRACT

A method and apparatus for reducing the amount of water-soluble acid pollutants contained in hot smoke or fumes produced by combustion, such as the incineration of household garbage, in the course of which dust is removed from the smoke and the smoke is then cooled before being released into the atmosphere. A heat exchange process involving a cold fluid is used in the cooling phase, in which the smoke is cooled to a temperature below its dew point so that the resulting total or partial condensation of the water vapor contained in the smoke traps acid pollutants.

9 Claims, 3 Drawing Figures

METHOD AND APPARATUS FOR REDUCING ACID POLLUTANTS IN SMOKE

BACKGROUND OF THE INVENTION

This invention concerns a method and apparatus for reducing the amounts of gaseous pollutants, particularly acid pollutants, contained in gaseous emissions such as the smoke produced in burning various fuels or in incinerating wastes, including household garbage.

Smoke resulting from the burning of many fuels containing quantities of sulfur carries with it a certain amount of sulfur dioxide or sulfurous acid anhydride ($SO_2$).

Smoke from the incineration of wastes containing chlorine, chiefly in the form of chlorous plastic materials (especially polyvinyl chloride (PVC)) will contain hydrogen chloride gas (HCl) in quantities that vary with the origin of the wastes. In household garbage, for example, the average HCl content is close to 1 g/Nm3 under standard conditions of evaluation (7 percent $CO_2$ or 11 percent $O_2$), for which maximum discharge amounts have been established. For such wastes, the $SO_2$ content of the smoke may be, by contrast, relatively low (on the order of several hundred milligrams per Nm3), whereas it may reach several grams with certain fuels.

Depending on the circumstances of combustion, regardless of what is being burned, smoke and fumes will also contain nitrous oxides (NOx) and often traces of other acid pollutants such as hydrofluoric acid (HF).

In order to protect the environment and to comply with current regulations, smoke and fumes must be treated so as to lower the amount of acid pollutants they contain.

Because these acid pollutants are water soluble, many antipollution processes consist of washing or scrubbing the smoke or fumes with water.

Other known processes recommend injecting one or more basic reagents into the smoke, using one of the three following procedures:

1. dry method: reagents are injected in powder form, or the gases pass over beds of the reagents, with the beds generally being stationary;

2. semi-dry method: reagents are injected in the form of a solution that is sufficiently concentrated to allow the reaction products to be collected in powder form;

3. wet method: reagents are injected in the form of a solution, and the reaction products are also removed in the form of a solution.

Injecting neutralizing substances such as lime quickly results in fouling due to deposits of the products formed. This in turn requires periodic or cyclical cleaning by chemical or mechanical means.

Preferentially, the reagents are selected from among the carbonates or, better, from the alkaline or alkaline-earth hydroxides, usually unhydrated lime (CaO) or hydrated lime ($Ca(OH)_2$).

Whatever reagent is used, a circuit for injecting it into the smoke must be provided, as well as another circuit for removing the reaction products: chlorides, sulfates, alkaline or alkaline-earth, powder or solution. Operating this part of the installation represents a sizable segment of the total cost of treating emissions. Installing it entails a considerable increase in investment.

Given the kinetics of reaction, it is necessary to use reagents in quantities two or three times greater than the stoichiometric quantity in dry-method processes, and at least the stoichiometric quantity in the semi-dry or wet-method processes.

The process of the invention makes it possible to reduce the amount of water-soluble gaseous acid pollutants contained in smoke or fumes resulting from combustion to a level that will be below regulatory maximums without injecting the smoke or fumes with water or a reagent in solution or powder form.

SUMMARY OF THE INVENTION

The object of the instant invention is therefore to provide a method and apparatus for reducing the amount of water-soluble acid pollutants contained in hot smoke or fumes produced by combustion means, in the course of which process dust is removed from the smoke or fumes and the latter is then cooled before being released into the atmosphere. A heat exchange process involving a cold fluid is used in the cooling phase, in which the smoke is cooled to a temperature below its dew point so that the resulting total or partial condensation of the water vapor contained in the smoke traps acid pollutants.

The invention makes it possible to reduce the amount of gaseous pollutants, including acids soluble in water and in condensable vapor, to levels below the permissible maximums, without having to make use of means for washing or scrubbing the gases or for injecting neutralizing reagents directly into the smoke or fumes.

The process of the invention involves smaller quantities of liquid acids, requiring a small-scale effluent-treatment facility that is low in cost.

By recovering heat from the waste gas, the process of the invention is also able to provide quantities of heated auxiliary fluids and hot air. The hot air may be used conventionally as combustion air, to improve boiler efficiency, or as a gas with which to dilute cooled smoke saturated with steam before it is released into the atmosphere, thus lowering its dew point and making it possible to reduce or eliminate the wreath that forms around the smokestack.

The object of the invention comprises (i) means for removing the dust from smoke produced by combustion means, (ii) at least one heat exchanger, and (iii) a smokestack for discharging treated smoke into the atmosphere, in which apparatus the heat exchanger uses air as a coolant, is positioned in the path of smoke passing over it along a descending vertical path, and comprises, at its base, means for collecting condensed water containing acid pollutants, which means allow smoke to pass through freely while they carry the acid solutions away to a neutralizing tank.

DETAILED DESCRIPTION OF THE PREFERRED EMBODIMENTS

Figure 1:
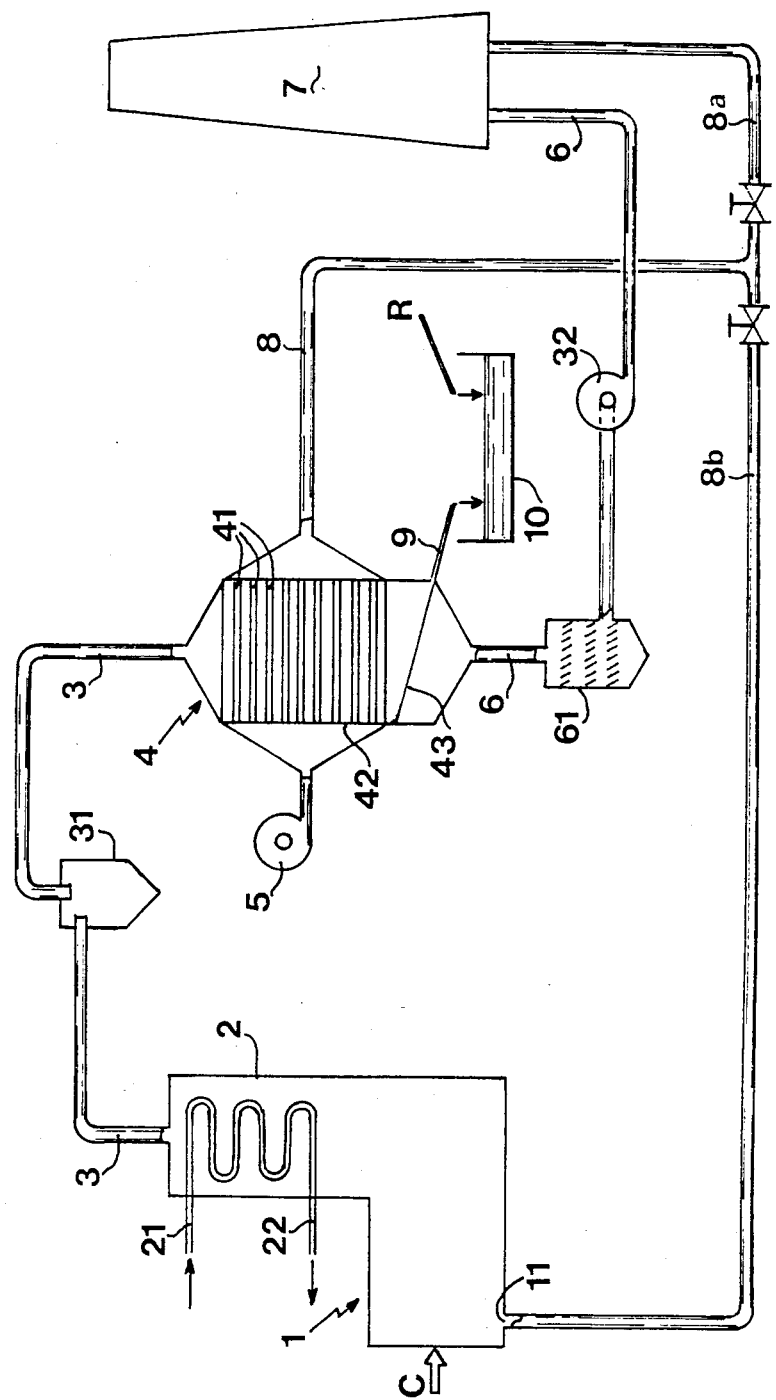
FIG. 1 is a schematic diagram showing a first embodiment of an apparatus for treating smoke and fumes produced by combustion in accordance with the invention.

The smoke treatment means shown in FIG. 1 are connected to combustion means 1 which include a heat-recovering boiler 2 supplied with water through a pipe 21 and producing steam which exits through pipe 22. The smoke and fumes resulting from the combustion of a fuel C leave boiler 2 through pipe 3 at a relatively low temperature, e.g., 250°–300° C. They then pass through dust-removing means, represented here by a cyclone 31, which could be replaced with other means, e.g., an electrostatic dust scrubber.

Smoke from which the dust has been removed then enters heat exchanging means 4 composed of a smoke-air exchanger comprising numerous exchange surfaces, e.g., a nest of tubes 41 which circulate the cooling air provided by a fan 5, while the smoke circulates over the outside of exchange surfaces 41 within the space formed by end plates 42 and a shell (not shown) around the nest of tubes. The exchanger may be of any type, e.g., countercurrent, cocurrent, or crossed-currents. The smoke or fumes pass through it along a descending vertical path. Steam is partially condensed, particularly in that portion of the exchanger that is closest to the smoke outlet, i.e., the portion where the smoke is coldest. Condensed water, laden with water-soluble compounds, is collected by a device 43 located at the base of the exchanger, such as one or more gutters that will allow smoke to pass through freely without pulling condensates along with it. The condensed water is then carried away through a pipe 9 into a tank 10 where the solution is neutralized using reagents R.

The cooled smoke, saturated with steam and possibly containing droplets, exits exchanger 4 through a pipe 6 in its lower part. It then passes through a devesiculator 61 to trap any droplets that might still be present, following which it is aspirated by a fan 32, which sends it up a stack 7. It should be noted that in a variant, fan 32 may also be located on the pipe 3 lying upstream from exchanger 4.

The air used as the cooling fluid in exchanger 4 is drawn from the atmosphere by the suction of fan 5. After passing over exchange surfaces 41, the heated air is sent through a pipe 8 which branches into two directions corresponding to two different uses.

One branch 8a leads to stack 7 where the heated air is mixed with cooled, saturated smoke arriving through pipe 6 in order to lower the dew point of the discharged mixture, thus helping to narrow the conditions under which a wreath will form over the stack and to prevent the condensation of steam in the stack itself, which would cause corrosion problems.

A second branch 8b leads to boiler 1, into which it opens through at least one opening 11, improving combustion efficiency.

Figure 2:
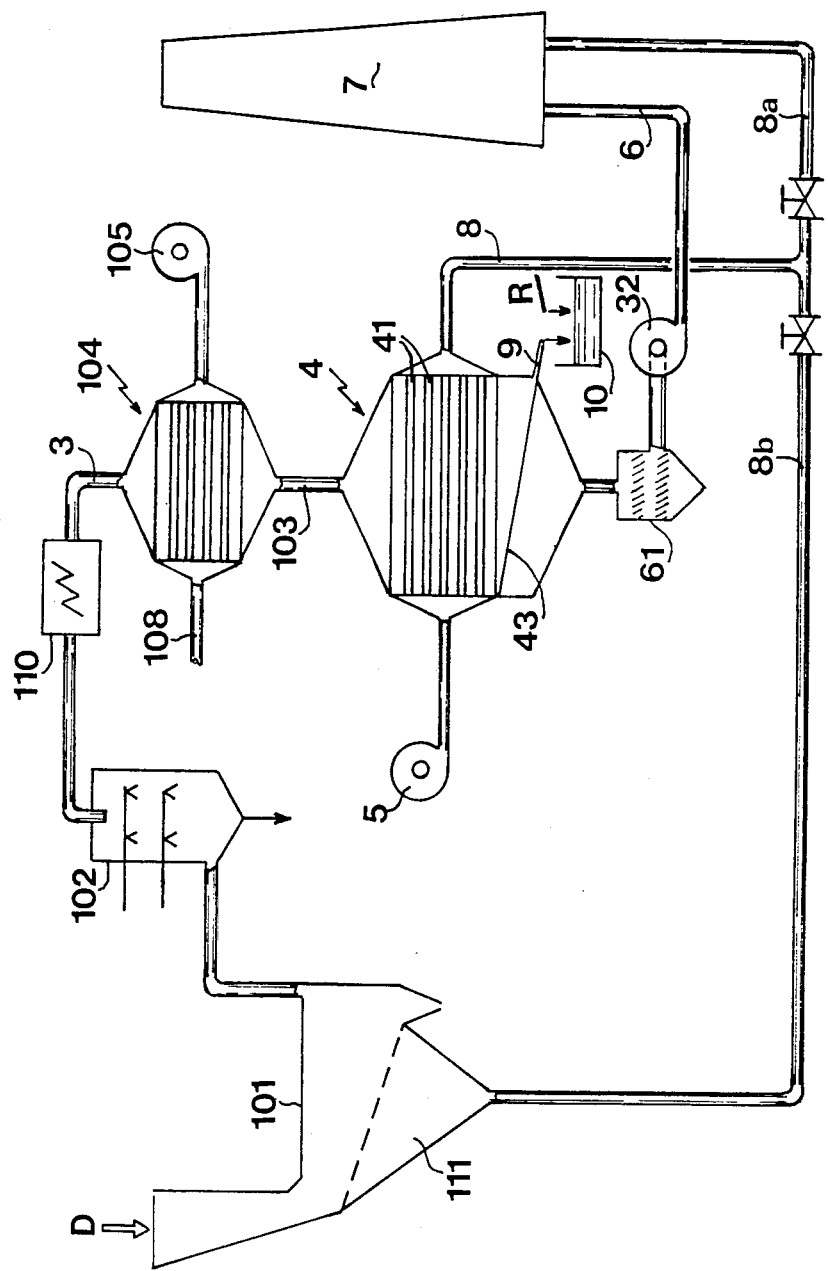
FIG. 2 is a diagram analogous to that of FIG. 1 but involving waste incineration means.

In accordance with FIG. 2, a second embodiment of the smoke treatment means of the invention is specially adapted to the task of incinerating wastes without recovery of heat. The unit comprises an incinerator 101 supplied with wastes D, which may be household garbage. The high-temperature smoke produced by the incineration process passes through cooling means 102 consisting of a water-sprinkling tower before entering an electrostatic dust-scrubber 110.

The cooled smoke moves through pipe 3 to an exchange system designed to produce partial condensation of the steam present. In this example, the exchange system comprises two exchangers positioned in series in the smoke circuit. The first, a water-smoke exchanger 104, is supplied with relatively cold water from a pump 105, with the water draining off through pipe 108.

The exchanger 104 is sized so that smoke exits through pipe 103 at a temperature that is higher than the highest acid dew point of the complex mixture of gases that make up the smoke. In practice, this means the acid dew point for sulfur dioxide (SO2), which is between 130° and 180° C.

Exchanger 104 makes it possible to reduce the size of the second exchanger 4, which uses condensation to trap acid pollutants. This is an attractive feature, since condensation exchanger 4 is more complex in its construction, and thus more costly, than a noncondensing exchanger, since it must withstand acid condensates.

The smoke, which is close to the dew point upon leaving water-smoke exchanger 104, enters condensation exchanger 4, which is similar to the one described in the first embodiment but smaller in the dimension lying in the direction of the path of the smoke. Reference numbers identical to those used in FIG. 1 are used again to designate the auxiliary equipment through which the smoke and condensate then move. The auxiliary equipment is identical to that previously described.

Thus, smoke arriving through pipe 103 moves over the outside of exchange surfaces 41, at least part of which is at a temperature lower than the dew point of the smoke. This causes part of the steam contained in the smoke to condense, effectively trapping most of the gaseous pollutants, including the acid pollutants. The condensates laden with those notably acid pollutants are collected in means 43 and diverted toward treatment tank 10.

Similarly, the preheated air leaving exchanger 4 through line 8 is separated into two fractions. One fraction moves through line 8a into stack 7 to dilute cooled and saturated smoke and thereby prevent the formation of a smoke wreath above the stack and condensation within it. The other fraction travels through line 8b to incinerator 101, partly into chamber 111 which supplies the furnace with primary air below the grate, thus improving combustion efficiency, and partly as secondary air to the furnace hearth (not shown).

Figure 3:
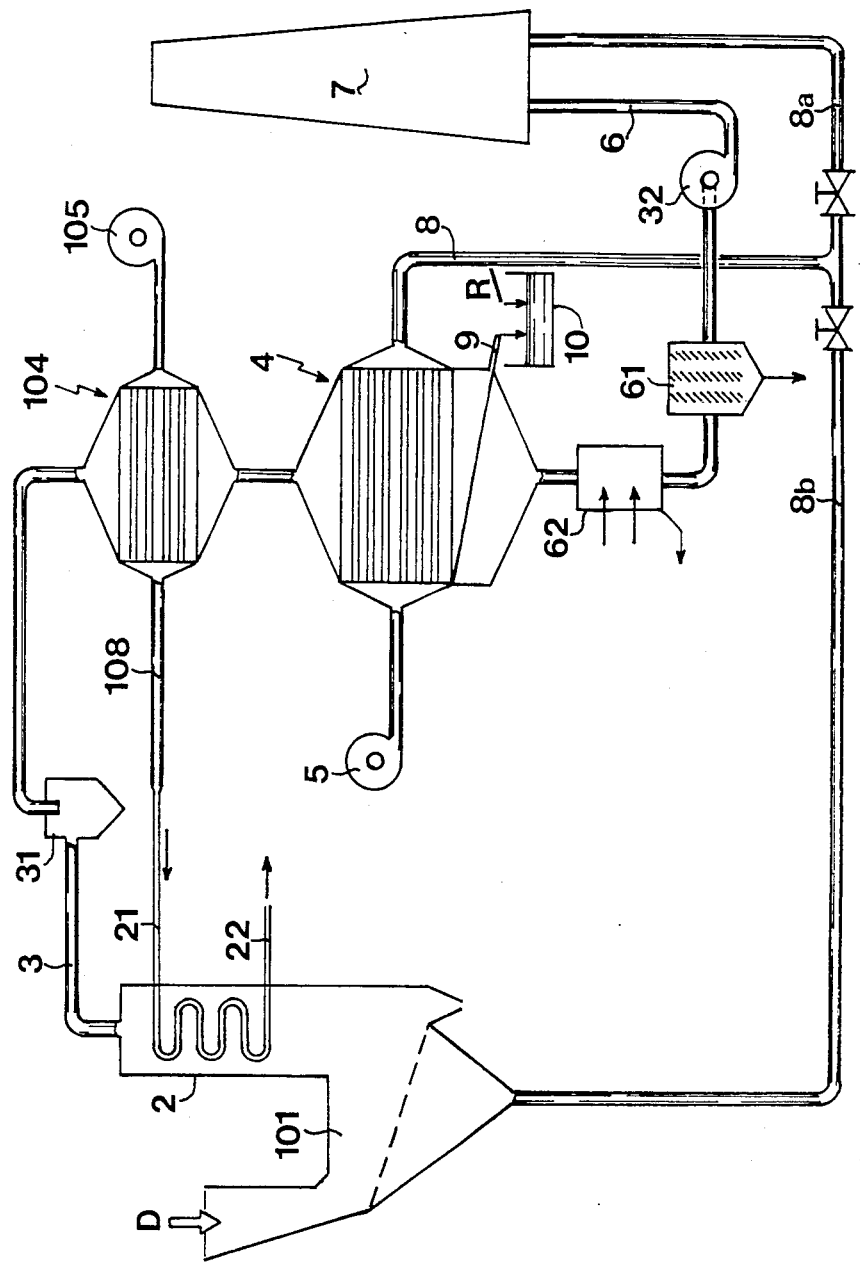
FIG. 3 is a diagram similar to FIG. 2 showing a variant of the invention, likewise applied to waste incineration means.

In a variant represented in FIG. 3, exchanger 104 is connected to the incinerator. The unit comprises an incinerator 101 supplied with wastes D and linked to a recuperative boiler 2. Smoke, the temperature of which has been brought down to 250°–300° C. by boiler 2, moves through pipe 3 to a primary dust removal unit 31 (which may be a cyclone) and then into coupled exchangers 104 and 4, which are similar to those described in connection with the previous embodiment. The first exchanger, water-smoke unit 104, here makes possible a preheating of the feed water of recuperative boiler 2, since the exchanger's outlet 108 is connected to intake 21 of the boiler water circuit.

Condensing exchanger 4, with its auxiliary equipment, is analogous to that presented in the preceding embodiment, and the preheated air is put to the same uses.

In yet another variant, also shown in FIG. 3, the cooled and saturated smoke, after leaving exchanger 4, passes through a wet scrubber 62, which may be of the venturi type, in which injected water produces a liquid effluent that is treated in an installation of known type which is not shown. The smoke then passes through a devesiculator 61 before being discharged into stack 7 by means of fan 32.

The placement of scrubber or dust remover 62 downstream from smoke-air exchanger 4 has several advantages, to wit:

(a) because smoke entering the scrubber is saturated with humidity, the wash water cannot evaporate into it, with the result that there is no increase in the size of the smoke wreath issuing from the stack;

(b) because the temperature of the wash water is lower than that of the smoke, part of the steam contained in the smoke condenses; the centripetal flow of steam toward the droplets of wash water encourages the scattering of dust particles toward the droplets, thus facilitating their entrapment;

(c) because most of the acid pollutants have been removed from the smoke entering the scrubber, the effluents from the scrubber are low in acids and thus easier to treat; and (d) because the droplets carried by the smoke emerging from scrubber 62 have a granulometry that is greater than that of the droplets borne by smoke emerging from exchanger 4, the efficiency of devesiculator.61 is considerably improved.

The operation of the smoke treatment means in accordance with any of the foregoing embodiments, or in accordance with an embodiment combining all or part of the components of the three examples provided above, or their equivalents, is presented below.

An essential part of the device is the indirect heat exchange system, which makes it possible to lower the temperature of the smoke to below the dew point, causing some of the steam contained in the smoke to condense, thus trapping most of the water-soluble gaseous pollutants, including the acid pollutants. The entrapment occurs by virtue of the centripetal movement of the steam in the condensation phase, which draws the molecules of pollutants toward the forming droplet, reducing resistance to mass transfer.

Smoke produced by combustion, occurring either in combustion means 1 using any fuel C, or in an incinerator 101 for wastes D, enters a unit in which its temperature is lowered to within the 200°–300° C. range, either preferentially in a recuperative boiler 2, or else in a water-sprinkler tower 102 if recovery of heat is not desired.

The gases cooled by one or the other process preferentially enter dust removing means 31 or 110 (cyclone, electrostatic filter, etc.) which remove the majority of the dust present before the smoke enters the exchanger-condenser, thus avoiding an overly rapid fouling of the exchange surfaces through deposits of the largest dust particles and limiting the quantity of dry matter drained into the condensates.

Smoke then passes into the indirect exchanger, which enables part of the steam it contains to be condensed. The exchange process may be performed in a single exchanger, e.g., an air-smoke exchanger (reference 4, FIG. 1), or by two sequential exchangers positioned in the path of the smoke, e.g., (FIGS. 2 and 3) a water-smoke exchanger 104 for bringing the smoke down to a temperature that will still be above the highest acid dew point, followed by a second exchanger-condenser 4 which lowers the temperature of the smoke to below its dew point.

A fraction of the steam contained in the smoke is thereby caused to condense, first in the form of droplets forming on the outside of the exchange surfaces 41, which grow to form a film that runs down in the form of drops from one exchange surface (tube or plate) to another located at a lower level. The condensed water traps most of the gaseous pollutants, including the acid pollutants, present in the smoke, the water-solubility of which is high. An acid solution is thus formed which may be very concentrated in the part of the exchanger where condensation begins (e.g., greater than 10 percent HCl) and may have a very low pH (less than 1). This means that all of the parts of exchanger 4 that are in contact with smoke and its condensates (exchange surfaces 41, walls of the condenser tube shell, distribution plates 42, and condensate collector 43) must be made of materials that will withstand concentrated and dilute solutions of various acids.

The condensates containing acid compounds (HCl, $SO_2$, $NO_x$, HF, $CO_2$, etc.) move through pipe 9 to tank 10, where acid-neutralizing reagents 10 are added. The neutralization process can be precisely monitored, e.g., by tracking the pH of the solution, so as to avoid adding any more than the necessary quantity of reagents, thus, by contrast with prior art processes, producing savings in the cost of reagents. Above all, the process allows acid condensates to be treated outside the smoke circuit, thus avoiding deposits in the exchanger.

Condensable substances such as metallic vapors (Hg, Cd, Pb, etc.) and certain organic compounds formed during combustion are also drained away with the condensates. Some of these substances are attacked by the acids contained in the condensates. The reactions will preferentially form insoluble products which can be collected with the solid residues of condensate following the neutralization treatment. In this way, for example, metallic mercury will tend to form mercurous chloride (HgCl), and lead will form lead sulfate ($PbSO_4$).

The apparatus of the invention for reducing the quantities of gaseous pollutants, including acids, and condensable products contained in incinerator smoke is produced using components known per se.

If the smoke temperature is lowered in two stages, the first exchanger in the smoke path will advantageously be a water-smoke exchanger of a known type. The dangers of corrosion are very slight, since condensation is avoided.

By contrast, the actual exchanger-condenser, which may serve as the sole means of lowering the smoke's temperature or may be placed behind the above-mentioned water-smoke exchanger, must necessarily be made of materials capable of withstanding corrosion by concentrated or dilute acid solutions. Exchangers with glass tubes or plates may be used, in which all seals (connections to distributor plates, etc.) are formed from fluorated plastics (e.g., polytetrafluorethylene).

Another possibility, one more satisfactory from the point of view of heat exchange, is the use of exchangers constructed wholly or partially from titanium.

It is also possible to build an exchanger-condenser out of plastic materials, but in such a case it would be necessary to place a noncondensing exchanger before the plastic exchanger in order to bring the temperature of the smoke down to a sufficiently low level.

Graphite can be used to produce exchangers that will stand up perfectly to any of the acids that might be encountered in combustion gases.

Tests conducted on an existing garbage incinerating facility made it possible to verify the soundness of the hypotheses adopted in the design phase. The tests were performed with a portion of the combustion gases that were diverted onto a water-smoke exchanger-condenser, i.e., the simplest system to implement for test purposes. Reduced to standard evaluation conditions, the smoke rate was 1,700 Nm3/h.

The following table summarizes the upstream and downstream conditions of the smoke, with pollutant levels expressed in mg/Nm3 reduced to 7 percent CO2.

|  | Upstream | Downstream | Purifying power |
|---|---|---|---|
| Temperature °C. | 223 | 30 |  |
| HCl content | 1,813 | 79 | 96% |
| SO2 content | 207 | 22 | 89% |

Titration of the condensates collected showed that they contained more than 10 g/l of hydrochloric acid (HCl).

In contrast to known processes, which are heavy consumers of energy, the instant process enables considerable amounts of heat to be recovered with respect to the amount of electrical power expended.

In fact, by virtue of the slow circulation of smoke and fluids, heat losses are low and, consequently, the consumption of electrical power is low as well. In addition, the energy recovered by heat exchangers 104 and 4 (FIG. 3) is very great, because the heat recovered by the fluids flowing through pipes 8b and 108 represents 15 to 22 percent of the energy recovered by boiler 2. Thus it is possible, through the sale of the heat recovered, to meet operating expenses and all or part of the equipment payments.

What is claimed is:

1. A method for reducing the amount of water-soluble acid pollutants contained in hot smoke produced by combustion means (1; 101), comprising the steps of:
   (a) removing dust from said smoke (31; 110),
   (b) cooling the smoke to a temperature below a dew point thereof so that water vapor contained therein condenses and traps acid pollutants, said smoke being cooled by passing it through a heat exchanger (4) in thermal communication with a cold fluid in a descending vertical path,
   (c) collecting and draining off the condensate (43, 9) for neutralization of the acid pollutants trapped therein with a reagent (10, R),
   (d) passing smoke exiting the heat exchanger through means (61) for trapping remaining condensate droplets carried by the smoke, and
   (e) releasing smoke exiting the trapping means to the atmosphere (7).

2. The method of claim 1, wherein, after dust removal and before cooling in the heat exchanger, the smoke is initially cooled (104) to a temperature higher than a highest dew point of acidic substances in the smoke.

3. The method of claim 2, wherein the temperature of the smoke after said initial cooling is between 130° C. and 180° C.

4. The method of claim 2, wherein said initial cooling is implemented using water.

5. The method of claim 1, wherein the cold fluid is air which, after being heated through thermal contact with the smoke in the heat exchanger, is separated into two fractions, a first of said fractions being mixed with cooled smoke during its release to the atmosphere, and a second of said fractions being conveyed to the combustion means as supplementary combustion air.

6. An apparatus for reducing the amount of water-soluble acid pollutants contained in hot smoke produced by combustion means (1; 101), comprising:
   (a) means (31; 100) for removing dust from said smoke,
   (b) a heat exchanger (4) coupled to an outlet of the dust removing means for cooling the smoke to a temperature below a dew point thereof such that water vapor contained therein condenses and traps acid pollutants,
   (c) means (43, 9) operatively associated with the heat exchanger for collecting and draining off the condensate for neutralization of the acid pollutants trapped therein with a reagant (R),
   (d) devesiculator means (61) coupled to an outlet of the heat exchanger for trapping remaining condensate droplets carried by the smoke, and
   (e) a smokestack (7) coupled to an outlet of the devesiculator means for discharging treated smoke to the atmosphere, wherein:
      (1) air is forced through the heat exchanger as a coolant, and
      (2) the heat exchanger defines a vertically descending flow path for the smoke.

7. The apparatus of claim 6, further comprising a further heat exchanger (104) interposed between the dust removing means and said heat exchanger, a recuperative boiler (2) comprising part of the combustion means, and means (105, 108, 21) for circulating water as a cooling fluid through said further heat exchanger and said boiler, in succession.

8. The apparatus of claim 6, further comprising a wet dust-scrubber (62) interposed immediately downstream from the heat exchanger (4) and upstream from the devesiculator means.

9. The apparatus of claim 6, wherein the combustion means (101) comprises an incinerator of household refuse or garbage.

* * * * *